United States Patent
Lee et al.

(10) Patent No.: US 10,191,728 B2
(45) Date of Patent: Jan. 29, 2019

(54) SYSTEM AND METHOD TO REDUCE STORAGE AREA USAGE OF ANDROID APPLICATION

(71) Applicant: Samsung Electronics Co., Ltd., Gyeonggi-do (KR)

(72) Inventors: Sung Hwan Lee, Bellevue, WA (US); Minseok Choi, Issaquah, WA (US); Moonhyun Jung, Issaquah, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/880,640

(22) Filed: Oct. 12, 2015

(65) Prior Publication Data
US 2017/0102929 A1 Apr. 13, 2017

(51) Int. Cl.
*G06F 9/445* (2018.01)
*G06F 8/61* (2018.01)
*G06F 8/65* (2018.01)

(52) U.S. Cl.
CPC . *G06F 8/61* (2013.01); *G06F 8/65* (2013.01)

(58) Field of Classification Search
CPC ........................................................ G06F 8/61
USPC ....................................................... 717/173
See application file for complete search history.

(56) References Cited

U.S. PATENT DOCUMENTS

| | | | |
|---|---|---|---|
| 9,021,427 B2* | 4/2015 | Liu | G06F 8/51 717/113 |
| 2004/0107349 A1* | 6/2004 | Sasselli | H04L 9/0891 713/176 |
| 2007/0220260 A1* | 9/2007 | King | G06F 21/64 713/176 |

(Continued)

OTHER PUBLICATIONS

European Patent Office, "European Search Report," Application No. 16167241.5, dated Feb. 16, 2017, 8 pages, publisher EPO, Munich, Germany.

(Continued)

*Primary Examiner* — Wei Y Zhen
*Assistant Examiner* — Lanny N Ung

(57) ABSTRACT

A mobile device based on an Android™ operating system configure to reduce the size of downloaded Android™ application packages. The mobile device comprises a storage device configured to store data, transceiver circuitry for downloading an Android™ application package, and a package manager. The package manager analyzes resources in the downloaded Android™ application package; identifies unnecessary resources that are not suitable for use by the mobile device; deletes the unnecessary resources; generates from the remaining resources an optimized Android™ application package having a smaller size than the downloaded Android™ application package; and stores the optimized Android™ application package in the storage device under the same name as the downloaded Android™ application package. The package manager also identifies an original security certificate in the downloaded Android™ application (Continued)

package; and generates from the optimized Android™ application package a new security certificate. The package manager uses the original security certificate and the new security certificate to download an updated version of the Android™ application package.

20 Claims, 6 Drawing Sheets

(56) References Cited

U.S. PATENT DOCUMENTS

| | | | | |
|---|---|---|---|---|
| 2008/0155691 | A1* | 6/2008 | Fossen | G06F 21/562 726/22 |
| 2010/0023934 | A1* | 1/2010 | Sheehan | G06F 9/44536 717/168 |
| 2014/0032913 | A1* | 1/2014 | Tenenboym | H04L 9/321 713/176 |
| 2015/0082298 | A1* | 3/2015 | Wang | G06F 8/60 717/174 |
| 2015/0277885 | A1* | 10/2015 | Kimoto | G06F 8/61 717/174 |

OTHER PUBLICATIONS

Communication pursuant to Article 94(3) EPC dated Sep. 22, 2017 in connection with European Patent Application No. 16 167 241.5.

* cited by examiner

| Attribute Name | Description |
|---|---|
| Name | Package name |
| codePath | APK file installation location |
| nativeLibraryPath | Native library (*.so file) path |
| Flag | Store Application Flags |
| ft | Timestamp in hex format |
| Lt | Timestamp in hex format of first time installation |
| Ut | Timestamp in hex format of last update |
| version | Version code from AndroidManifest.xml file |
| sharedUserId | The name of Linux user ID that will be shared with other applications. It is same parameter as in AndroidManifest.xml |
| userId | The name of a Linux user ID |
| Sub Tags | sigs signature information, count attribute represents the number of cert tag |
| | cert contains certification key, index attribute represents the global index of certificate |
| | perms contain permission which developer has set in Android Manifest.xml |

SYSTEM AND METHOD TO REDUCE STORAGE AREA USAGE OF ANDROID APPLICATION

TECHNICAL FIELD

The present application relates generally to wireless devices and, more specifically, to a technique for saving storage space on an Android™ wireless device.

BACKGROUND

Wireless devices based on the Android™ platform come in many shapes and sizes and are sold around the world. With such a wide range of devices, Android™ application developers are confronted with innumerable device configurations, including different languages, different screen sizes and resolutions, different mobile carriers/operators, and multiple versions of the Android™ platform. In order to deal with this issue effectively, Android™ creates a sophisticated mechanism for supporting various devices with a single package file format. The Android™ application package (APK) is the package file format used by the Android™ operating system to distribute and to install application software and middleware.

An Android™ program is complied and all of the program components are packaged into one APK file. The APK file may have any name that ends with the extension ".apk". The APK file contains all of the program code (such as .dex files), resources, assets, certificates, and a manifest file. APK files are a type of archive file, typically in zip format packages based on the JAR file format. An APK file may be downloaded and installed on Android™ devices in the same manner as installing software on a desktop or laptop computer.

For example, if an application developer decides to support a new language, a new language string.xml may be created in a different resource directory with language code, as in the following example:

```
MyProject/
    res/
        values/
            strings.xml
        values-es/
            strings.xml
        values-fr/
            strings.xml
```

This is a useful solution for supporting various devices with one APK. However, the drawback is that using a single APK to support all possible implementations of different screen sizes, resolutions, languages, networks, and the like, consumes more storage space in order to keep all of the extra resources. A further demonstration of wasted image resource space is provided in the following example:

```
MyProject/
    res/
        drawable-xhdpi/
            awesomeimage.png
        drawable-hdpi/
            awesomeimage.png
        drawable-mdpi/
            awesomeimage.png
        drawable-ldpi/
            awesomeimage.png
```

The project in the above example uses multiple directories to support devices having various resolutions. But only one resource will actually be used when the application runs, because the target device has only one unique resolution. The rest of the resources will not be used unless a target device is changed.

Therefore, there is a need for improved systems and methods for saving storage space on an Android™ device. In particular, there is a need for systems and methods for eliminating or reducing unnecessary device storage space used by the APK file on an Android™ device.

SUMMARY

To address the above-discussed deficiencies of the prior art, it is a primary object to provide a mobile device based on an Android™ operating system comprising: 1) a storage device configured to store data; 2) transceiver circuitry configured to access a server via a wireless communication network and download from the server an Android™ application package; and 3) a package manager. The package manager is configured to: i) analyze resources in the downloaded Android™ application package; ii) identify unnecessary ones of the resources, the unnecessary resources comprising resources that are not suitable for use by the mobile device; iii) delete the unnecessary resources; iv) generate from the remaining resources an optimized Android™ application package having a smaller size than the downloaded Android™ application package; and v) store the optimized Android™ application package in the storage device in place of the downloaded Android™ application package.

In one embodiment, the package manager stores the optimized Android™ application package under the same name as the downloaded Android™ application package.

In another embodiment, the package manager is further configured to: i) identify an original security certificate in the downloaded Android™ application package; and ii) generate from the optimized Android™ application package a new security certificate.

In still another embodiment, the package manager is further configured to associate the original security certificate and the new security certificate in a table stored in the storage device.

In yet another embodiment, the package manager is configured to use the original security certificate and the new security certificate in order to download an updated version of the Android™ application package.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates an exemplary packaged XML, file produced by an Android™ package manager according to the principles of the present disclosure.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless device based on an Android™ platform.

The present disclosure describes systems and methods for reducing wasted storage space on an Android™-based device. This is done by taking advantage of the fact that the specifications of each target Android™ device is known and the APK file can be pared down to eliminate unnecessary resources in the APK file. In particular, the disclosed systems and methods reduce ROM usage of applications by removing duplicated and unused resources that are added just for compatibility purposes but are not necessary for a target device having a particular configuration to operate. The edited application in the APK file is then re-packaged with a different signing key. The storage occupancy becomes more critical in low storage memory devices in which the saved storage space may be used more productively.

Figure 1:
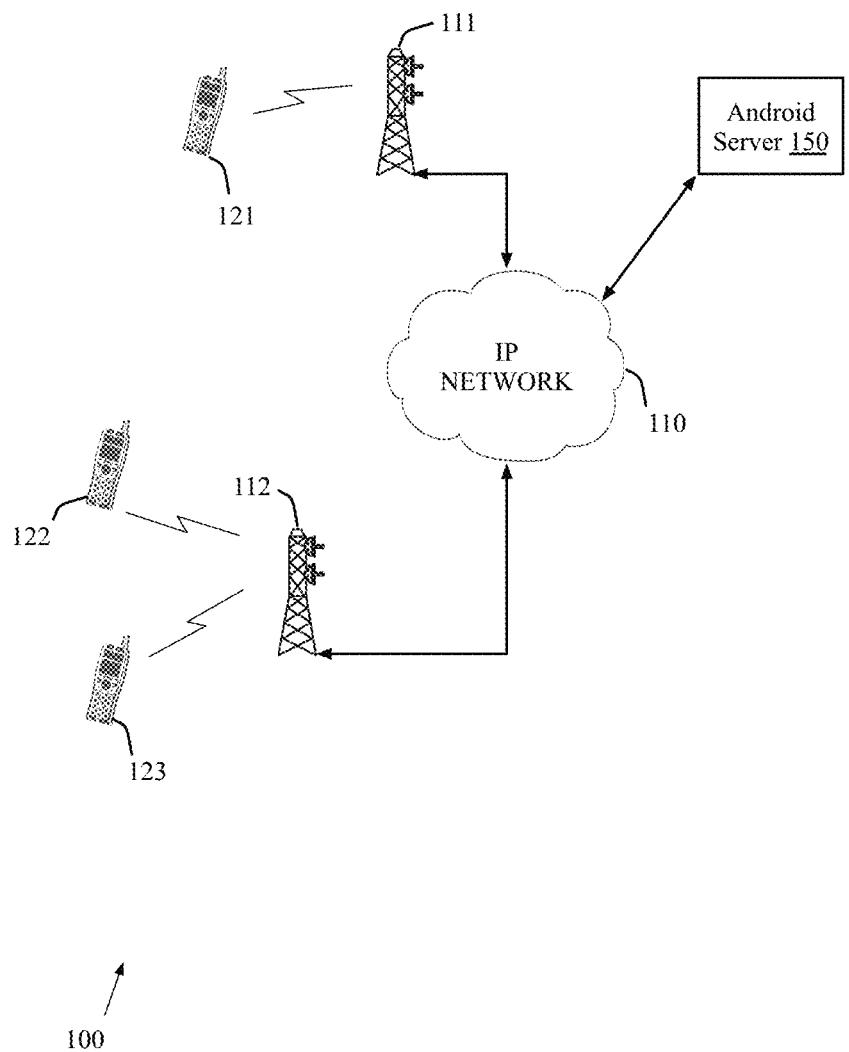
FIG. 1 illustrates a communication network that updates Android™-based wireless devices using APK files according to an embodiment of the disclosure.

FIG. 1 illustrates communication network 100, which updates Android™-based wireless devices using Android™ APK files according to an embodiment of the disclosure. Wireless network 100 includes base station (BS) 111 and BS 112. BS 111 and BS 112 may communicate with each other via wireless links or by a wireline backbone network (e.g., optical fiber, DSL, cable, T1/E1 line, etc.). By way of example, in FIG. 1, each of base stations 111 and 112 is configured to communicate with other base stations using Internet protocol (IP) network 110, which may be, for example, the Internet, a proprietary IP network, or another data network. Each of base stations 111 and 113 is also configured to communicate with a conventional circuit-switched telephone network (not shown), either directly or by means of network 110.

BS 111 provides wireless broadband access to network 110 to a first plurality of Android™-based mobile devices within a coverage area of BS 111. The first plurality of UEs includes mobile phone 121, among others. BS 112 provides wireless broadband access to network 110 to a second plurality of Android™-based mobile devices within a coverage area of BS 112. The second plurality of Android™-based mobile devices includes UE 122 and 123, among others. Each one of mobile devices 121-123 may be any of a number of types of wireless devices, including a wireless-enabled laptop computer, a personal data assistant, a notebook, a mobile phone, a tablet, or another wireless-enabled device.

It is noted that the term "base station" may be commonly used in some types of networks, such as CDMA2000 systems or some 3GPP systems. But "base station" is not universally used in all types of radio access technology (RAT). In some types of networks, the term "base station" may be replaced by "eNodeB", or "eNB", or "access point". For the purposes of simplicity and consistency, the term "base station" is used in this disclosure document, and in the claims in particular, to refer to the network infrastructure device that provides wireless access to user equipment.

Similarly, the term "mobile device" may be commonly used in some types of networks, but not in others. In some types of networks, the term "mobile device" may be replaced by "user equipment", "subscriber station", "mobile station", "remote terminal", "wireless terminal" or the like. For the purposes of simplicity and consistency, the term "mobile device" may be used in this disclosure document to refer to any remote wireless device that accesses the network infrastructure device (i.e., the base station).

According to the principles of the present disclosure, mobile devices 121-123 may access Android™ server 150 via base stations 111 and 112 and network 110. Android™ server 150 is operable to download APK files to mobile devices 121-123 as described hereafter. Android™ server 150 may be, for example, part of Google Play™ Store and/or Android Market™.

FIG. 2A illustrates an exemplary XML file 200 produced by an Android™ package manager according to the principles of the present disclosure. An Android™ operating system uses a certificate to guarantee that an Android™ application has not been tampered with or corrupted. If an APK file is tampered with (e.g., binary content is changed after signing process), the Android™ operating system detects the corruption because the certificate is no longer valid for the APK file. The certificate thereby prevents malicious attack from an unauthorized party.

By way of example, Android Market™ uses the following three major attributes to check if there is any update to an APK file: 1) Application Package Name, 2) Version Code, and 3) Certificate. If the package name and the certificate are the same on, for example, Android™ mobile device 121 and on Android™ server 150, but the version code in the Android Market™ is greater than the version code for the application in the target Android™ mobile device 121, Android™ server 150 and/or Android™ mobile device 121 determine that there is and available update and notify the user of mobile device 121 that an update is available. In mobile device 121, the Android™ package manager performs an important function when an Android™ application is installed, updated, or uninstalled. The Android™ package manager parses the application and registers the application information into XML file 200 with the attributes shown in FIG. 2A.

Figure 2B:
FIG. 2B illustrates an example of a certificate or signing key that is generated for an APK file according to the principles of the present disclosure.

FIG. 2B illustrates an example of a certificate or signing key 250 that is generated for an APK file. The signing key 250 is used to detect corruption of the APK file.

Figure 3:
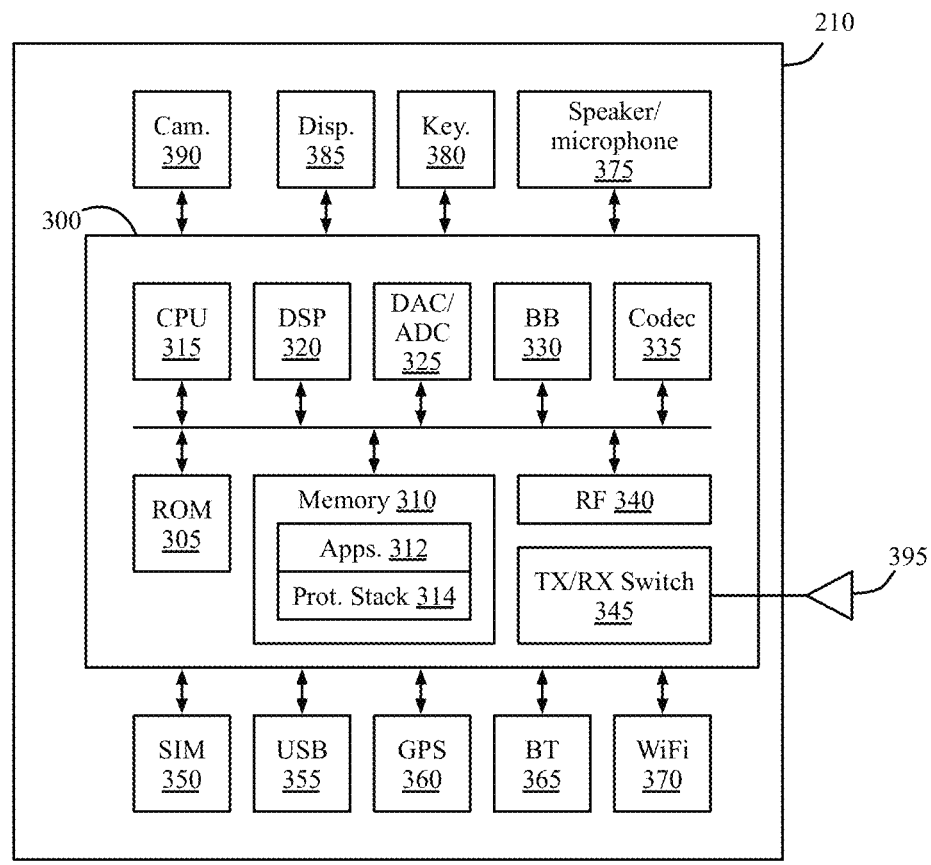
FIG. 3 illustrates in greater detail an exemplary mobile phone that optimizes APK files in order to improve storage space according to embodiments of the disclosure.

In general, mobile device 121 may be any type of wireless capable device, including a mobile phone, a desktop computer, a laptop computer, a tablet device, and the like. FIG. 3 below illustrates one particular embodiment of the present disclosure in which it is assumed that mobile device 121 is implemented as a mobile phone 121. However, those skilled in the art will understand that references below to "mobile phone 121" in FIG. 3 are by way of illustration only and should not be construed so as to limit the scope of the present disclosure or the claims that follow to a mobile phone implementation only.

FIG. 3 illustrates in greater detail exemplary mobile phone 121 that optimizes APK files in order to improve storage space according to embodiments of the disclosure. Mobile phone 121 comprises core circuitry 300, which includes read-only memory (ROM) 305, random access memory (RAM) 310, central processing unit (CPU) 315, digital signal processor (DSP) 320, digital-to-analog converter (DAC)/analog-to-digital converter (ADC) circuitry 325, baseband (BB) circuitry block 330, codec circuitry block 335, radio frequency (RF) circuitry block 340, transmit (TX)/receive (RX) switch 345, and antenna 395.

In one embodiment, ROM 305 may store a boot-routine and other static data and RAM 310 may store an operating system (not shown), applications 312, and protocol stack 314. In an advantageous embodiment, ROM 305 and RAM 310 may comprise a single electronically erasable memory, such as a Flash memory, that is used in conjunction with a conventional RAM memory that is used to store dynamic data. Applications in memory 312 may include an Android™ package manager and other download applications that interact with Android™ server 150. As described below in greater detail, the Android™ package manager, under control of CPU 315, is operable to download an original APK file from Android™ server 150 and to reduce the size of the original APK file to generate an optimized APK file.

Mobile phone 121 further comprises SIM card interface 350, USB interface 355, GPS receiver 360, Bluetooth (BT) transceiver 365, WiFi (or WLAN) transceiver 370, speaker and microphone circuitry block 375, keyboard 380, display 385, and camera 390. In some embodiment, keyboard 380 and display 385 may be implemented together as a touch screen display.

CPU 315 is responsible for the overall operation of mobile phone 121. In an exemplary embodiment, CPU 315 executes applications 312 and protocol stack 314. CPU 315 runs the application layer and a wide variety of applications may be run in a smart phone implementation. Applications 312 may include audio, video, and image/graphics applications. CPU 315 may run applications 312 that support various audio formats such as MP3, MP4, WAV, and rm. CPU 315 may run image applications 312 that support JPEG image formats and video applications 312 that support video formats (e.g., MPEG-1 to MPEG-5). CPU 315 may support various operating systems (not shown), such as Symbian™, Java™, Android™, RT-Linux, Palm, and the like. For time critical applications, CPU 315 runs a real-time operating system (RTOS). In addition to the physical layer, there are other layers, including protocol stack 314, that enable mobile phone 121 to work with a network base station. In an exemplary embodiment, protocol stack 314 is ported on CPU 315.

DAC/ADC circuitry block 325 converts analog speech signals to digital signals, and vice versa, in mobile phone 121. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keeping signals within the dynamic range of the DAC circuits. AFC keeps frequency error within limit to achieve better receiver performance.

Baseband (BB) circuitry block 330 may be implemented as part of DSP 320, which executes many of the baseband processing functions (i.e., physical layer, Layer 1, or L1 functions). BB circuitry block 300 may be ported on DSP 320 to meet the latency and power requirements of mobile phone 121. BB circuitry block 330 converts voice and data to be carried over the air interface to I/Q baseband signals.

BB circuitry block 330 may change from modem to modem for various air interface standards, such as GSM, CDMA, Wimax, LTE, HSPA, and others. BB circuitry block 330 is often referred to as the physical layer, or Layer 1, or L1. For mobile phones that work on GSM networks, the baseband part (Layer 1) running on DSP 320 and the protocol stack 314 running on CPU 315 are based on the GSM standard. For CDMA mobile phones, the Layer 1 and protocol stack 314 are based on the CDMA standard, and so on, for the LTE and HSPA standards-based mobile phones.

For speech or audio inputs, codec circuitry block 335 may compress and decompress the signal to match the data rate to the frame in which the data is sent. By way of example, codec circuitry block 335 may convert speech at an 8 KHz sampling rate to a 13 kbps rate for a full rate speech traffic channel. To do this, a residually excited linear predictive coder (RELP) speech coder may be which compresses 260 bits into a 20 millisecond duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a Viterbi decoder (used in receive path). Interleaving may be done for the data, which helps in spreading the error over time, thereby helping the receiver de-interleave and decode the frame correctly.

RF circuitry block 340 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 395 is a metallic object that converts and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of mobile phone 121, antenna 395 may support different wire-area standards, including GSM, CDMA, LTE, and WiMAX, as well as short-range standards, including WiFi (WLAN), Bluetooth, and so on.

If antenna 395 comprises only one antenna used for both transmit and receive operations at different times, the TX/RX switch 345 couples both the transmit (TX) path and the receive (RX) path to antenna 395 at different times. TX/RX switch 345 is controlled automatically by DSP 320 based on a GSM frame structure with respect to the physical slot allocated for that particular GSM mobile phone in both the downlink and the uplink. For frequency division duplexing (FDD) systems, TX/RX switch 345 may be implement as a diplexer that acts as filter to separate various frequency bands.

Figure 4:
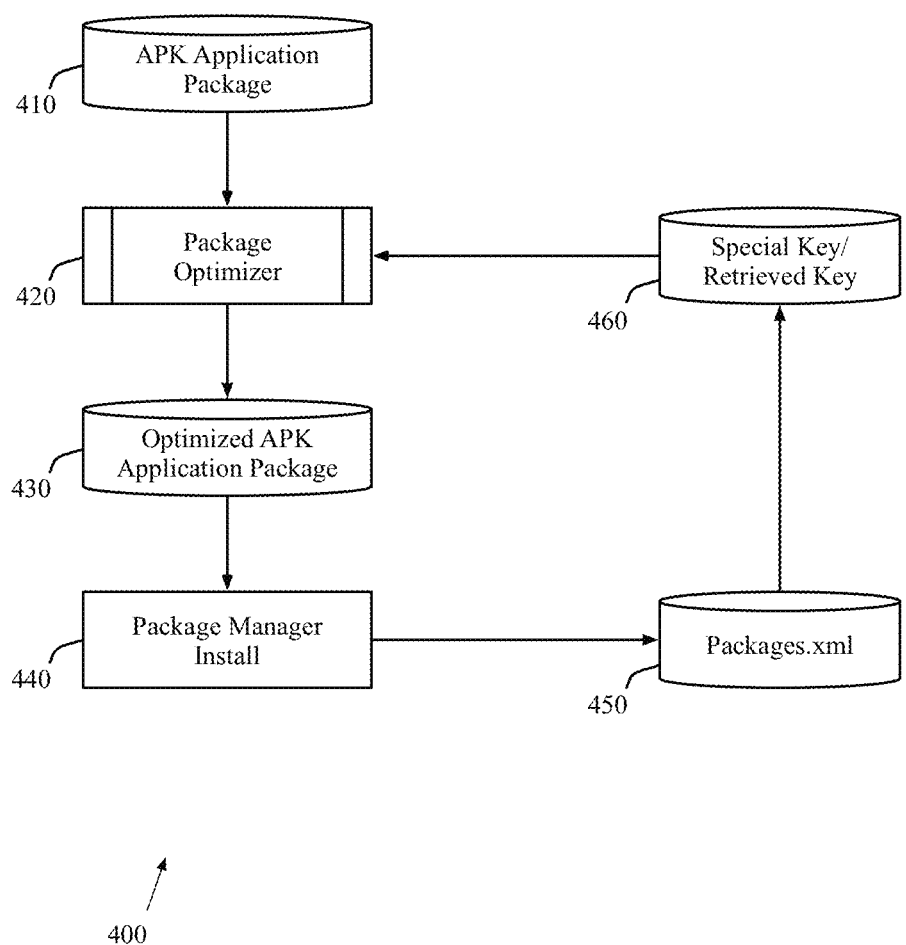
FIG. 4 illustrates the operation of an Android™ package manager in the exemplary mobile phone according to embodiments of the disclosure.

FIG. 4 illustrates the operation of Android™ package manager 400 in exemplary mobile phone 121 according to embodiments of the disclosure. In mobile phone 121, Android™ package manager 400 manages all applications. Android™ package manager 400 includes package optimizer function 420 that receives original Android™ APK application package 410, which has a .apk extension and generates therefrom an optimized Android™ APK application package 430, which has the same name and a .apk extension. The applications handled by Android™ package manager 400 include preloaded system applications and update applications from Android Market™. Packages.xml file 450 is an XML file that contains information about installed packages and is managed by Android™ package manager 400. Package manager install function 400 installs the optimized APK application package 440 and stores information about installed packages in packages.xml file 450.

Android™ package manager 400 parses and edits preloaded system applications and update applications in a way that reduces file size by removing unnecessary resource without affecting the functionality of the application in the target device. Android™ package manager 400 eliminates duplicate and unused resources, while still enabling applications to be updated through, for example, Google Play™ Store. After unnecessary resources are identified and removed, Android™ package manager 400 re-packages the modified and optimized APK application package with a different signature or certificate because the original signing key (private key) is not available. However, Android™ package manager 400 ensures that the optimized APK package with a different signature will still update through Google Play™ Store. Special key/retrieved key table 460 stores a mapping between the original certificates/keys and the newly generated certificates/keys generated from the optimized APK application package.

Figure 5:
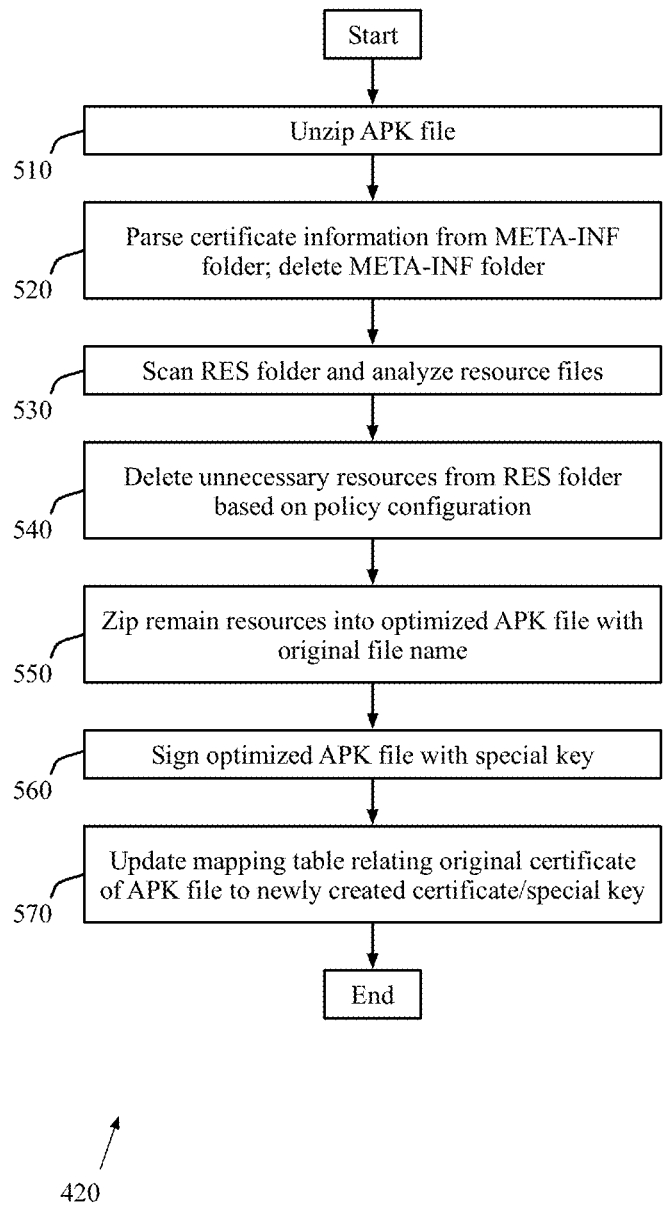
FIG. 5 is a flow diagram illustrating the operation of the package optimizer function according to the principles of the disclosure.

FIG. 5 is a flow diagram illustrating the operation of package optimizer function 420 in reducing APK package resources and size according to the principles of the present disclosure. Initially, Android™ package manager 400 adds a package to the queue for the installation process and determine the appropriate location, if needed, and determines the type of installation (i.e., install or update). Android™ package manager 400 may query package-related information to from packages.xml file 450, which may have an original package.

To optimize an original APK application package, Android™ package manager 400 executes package optimizer function 420. Package optimizer function 420 initially unzips a new or a preloaded .apk package (step 510). Next, package optimizer function 420 parses certificate-related information from the META-INF folder and then deletes the META-INF folder (step 520). Package optimizer function 420 then scans the RES (resource) folder and analyzes the resource files and elements based on selected target device parameters (e.g., DPI, MCC, MNC, etc.) (step 530). Package optimizer function 420 deletes unnecessary resources from the RES folder based on a pre-determined policy configuration (step 540). The policy governs which resources should remain, considering the fact that only certain resources will be used on the target mobile device 121. By way of example, package optimizer function 420 handles graphic assets efficiently because the graphic assets are related to device DPI and the DPI information does not change. Carrier information, such as MCC and MNC, and some layout .xml data with device DPI also may be considered as unchanged values. Therefore, package optimizer function 420 may safely remove these resource if, for example, device DPI or carrier information is known.

After the unnecessary resources files and other elements have been removed, package optimizer function 420 zips all of the remaining data into an optimized APK application package having the same name as the original APK application package 410 and the .apk extension (step 550). Package optimizer function 420 then signs the optimized APK application package 430 with a special key (step 560). The special key is intended to distinguish from other regular applications. With the special key, mobile phone 121 can determine if the APK application package uses the Reduce Storage Usage tool or not. Package manager install function 440 may then install the optimized APK application package 430 and reflect the installation information on packages.xml file 450 along with certificate-related information from the META-INF retrieved from the original APK package 410. Package optimizer function 420 creates a mapping table in special key/retrieved key table 460 between the original certificates and the newly created certificates (step 570). The mapping information is used to get updates from Android Market™, since Android Market™ only has the original certificate information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device based on an Android™ operating system comprising:
 a storage device configured to store data;
 transceiver circuitry configured to access a server via a wireless communication network and download, from the server, an Android™ application package; and
 a package manager configured to:
  analyze resources in the downloaded Android™ application package;
  identify unnecessary ones of the resources, the unnecessary resources comprising resources that are not suitable for use by the mobile device;
  delete the unnecessary resources;
  generate, from only resources remaining after deletion of the unnecessary resources, without adding new resources, an optimized Android™ application package having a smaller size than the downloaded Android™ application package;
  store the optimized Android™ application package in the storage device in place of the downloaded Android™ application package; and
  determine, based on a new signing key, that the optimized Android™ application package has a smaller size than the downloaded Android™ application package.

2. The mobile device as set forth in claim 1, wherein the package manager is configured to store the optimized Android™ application package under a same name as the downloaded Android™ application package.

3. The mobile device as set forth in claim 1, wherein the package manager is further configured to:
identify an original security certificate in the downloaded Android™ application package; and
generate from the optimized Android™ application package a new security certificate.

4. The mobile device as set forth in claim 3, wherein the package manager is further configured to associate the original security certificate and the new security certificate in a table stored in the storage device.

5. The mobile device as set forth in claim 4, wherein the package manager is configured to use the original security certificate and the new security certificate in order to download an updated version of the Android™ application package.

6. The mobile device as set forth in claim 1, wherein the package manager is further configured to:
generate the optimized Android™ application package using the new signing key,
wherein the new signing key is different from an original signing key, and
wherein the original signing key was used to generate the downloaded Android™ application package.

7. The mobile device as set forth in claim 3, wherein the package manager is further configured to:
parse certificate information from a META-INF folder in the downloaded Android™ application package; and
delete the META-INF folder.

8. The mobile device as set forth in claim 7, wherein the package manager is further configured to reflect installation information and the certificate information in an XML file.

9. The mobile device as set forth in claim 1, wherein the resources in the downloaded Android™ application package are analyzed based on selected target device parameters.

10. The mobile device as set forth in claim 9, wherein the selected target device parameters include at least one of dots per inch (DPI), a mobile country code (MCC), or a mobile network code (MNC).

11. For use in a mobile device based on an Android™ operating system and having a storage device for storing data, a method comprising:
accessing a server via a wireless communication network and downloading, from the server, an Android™ application package;
analyzing resources in the downloaded Android™ application package;
identifying unnecessary ones of the resources, the unnecessary resources comprising resources that are not suitable for use by the mobile device;
deleting the unnecessary resources;
generating, from only resources remaining after deleting the unnecessary resources, without adding new resources, an optimized Android™ application package having a smaller size than the downloaded Android™ application package;
storing the optimized Android™ application package in the storage device in place of the downloaded Android™ application package; and
determining, based on a new signing key, that the optimized Android™ application package has a smaller size than the downloaded Android™ application package.

12. The method as set forth in claim 11, wherein storing the optimized Android™ application package comprises storing the optimized Android™ application package under a same name as the downloaded Android™ application package.

13. The method as set forth in claim 11, further comprising:
identifying an original security certificate in the downloaded Android™ application package; and
generating from the optimized Android™ application package a new security certificate.

14. The method as set forth in claim 13, further comprising associating the original security certificate and the new security certificate in a table stored in the storage device.

15. The method as set forth in claim 13, further comprising using the original security certificate and the new security certificate in order to download an updated version of the Android™ application package.

16. The method as set forth in claim 11, further comprising:
generating the optimized Android™ application package using the new signing key,
wherein the new signing key is different from an original signing key, and
wherein the original signing key was used to generate the downloaded Android™ application package.

17. The method as set forth in claim 13, further comprising:
parsing certificate information from a META-INF folder in the downloaded Android™ application package; and
deleting the META-INF folder.

18. The method as set forth in claim 17, further comprising reflecting installation information and the certificate information in an XML file.

19. The method as set forth in claim 11, wherein the resources in the downloaded Android™ application package are analyzed based on selected target device parameters.

20. The method as set forth in claim 19, wherein the selected target device parameters include at least one of dots per inch (DPI), a mobile country code (MCC), or a mobile network code (MNC).

* * * * *